(12) United States Patent
Narayanaswamy et al.

(10) Patent No.: US 8,175,991 B2
(45) Date of Patent: May 8, 2012

(54) BUSINESS OPTIMIZATION ENGINE THAT EXTRACTS PROCESS LIFE CYCLE INFORMATION IN REAL TIME BY INSERTING STUBS INTO BUSINESS APPLICATIONS

(75) Inventors: Sreedhara Srinivasulu Narayanaswamy, Plano, TX (US); Sudhakar Anivella, Hyderabad (IN)

(73) Assignee: CA, Inc., Islandia, NY (US)

( * ) Notice: Subject to any disclaimer, the term of this patent is extended or adjusted under 35 U.S.C. 154(b) by 648 days.

(21) Appl. No.: 12/023,618

(22) Filed: Jan. 31, 2008

(65) Prior Publication Data
US 2009/0138425 A1 May 28, 2009

(51) Int. Cl.
*G06F 17/00* (2006.01)
(52) U.S. Cl. .......................... 706/45; 705/1.1
(58) Field of Classification Search .............. 706/45–48, 706/62; 705/1.1, 7, 300, 301
See application file for complete search history.

(56) References Cited

U.S. PATENT DOCUMENTS

| | | | |
|---|---|---|---|
| 5,734,837 A | 3/1998 | Flores et al. | |
| 6,073,109 A | 6/2000 | Flores et al. | |
| 7,272,817 B1 | 9/2007 | Hinkle et al. | |
| 2004/0187140 A1 | 9/2004 | Aigner et al. | |
| 2005/0154700 A1 | 7/2005 | Lele | |
| 2005/0289138 A1 | 12/2005 | Cheng et al. | |
| 2006/0190605 A1 | 8/2006 | Franz et al. | |
| 2006/0198639 A1 | 9/2006 | Giaretta et al. | |
| 2007/0226022 A1* | 9/2007 | Das et al. ........................ 705/7 |

OTHER PUBLICATIONS

Scacchi, Experience with software process simulation and modeling, 1998, USC Atrium Laboratory, pp. 1-10.*
Scacchi et al., Process Life-Cycle Engineering: A Knowledge-Based Approach and Environment, 1997, John Wiley & Sons, Ltd, pp. 1-25.*
Scacchi et al., Process-Driven Intranets: Life-Cycle Support for Process Reengineering, 1997, IEEE INternet Computing, pp. 1-8.*
Curbera et al., The Next Step in Web Services, 2003, Communications of ACM vol. 46 issue 10, pp. 1-6.*
Hill et al., Magic Quadrant for Business Process Management Suites, 2007, Gartner Research ID No. G00152906, pp. 1-31.*
Koliadis, et al., Combining i and BRMN for Business Process Model Lifecycle Management, 2006, BPM 2006 Workshops, LNCS 4103, pp. 1-12.*
Camacho et al., "SHAMASH. An AI Tool for Modeling and Optimizing Business Processes", IEEE, Proceedings of the 13th Int. Conference on Tools with Artificial Intelligence, 2001, pp. 306-313.
United States Official Action dated Mar. 2, 2011 from related U.S. Appl. No. 12/023,676.
United States Official Action dated Oct. 13, 2011from related U.S. Appl. No. 12/023,676.
United States Official Action dated Jun. 30, 2011 from related U.S. Appl. No. 12/023,741.

* cited by examiner

*Primary Examiner* — David Vincent
(74) *Attorney, Agent, or Firm* — Scully, Scott, Murphy & Presser, P.C.

(57) ABSTRACT

A system and method for optimizing enterprise applications driven by business processes is provided. The system includes a data repository, an extractor to perform real time extraction of process life cycle information from business solutions integrating heterogeneous independent business applications, the extractor storing the extracted information in the data repository, an analyzer to identify usage patterns in the extracted information, and an optimizer to optimize the extracted information and to create exportable output usable by external tools. The analyzer can employ user-defined algorithms and/or rules to identify the usage patterns. The optimizer can use process simulation mechanism, what-if analysis, data stored in the data repository, data stored in a rule repository, and user input data, in any combination, to optimize the extracted information.

6 Claims, 7 Drawing Sheets

Fig. 6

BSO Business Optimization Engine

| Extract | Analyze | Export BPML | Status | Optimizing done | Clear |

Issue: 123, Title: Mail not working
Priority: P1, Date Created: 01/02/2006T11:00:00

| Status | Description | Note By | TimeStamp |
|---|---|---|---|
| CREATED | Mail not working | Smith | 01/02/2006 T 11:00:00 |
| ASSIGNED | Mail not working | Bob | 01/02/2006 T 12:00:00 |
| WORKINPROGRESS | Please detail about it. Are you getting any specific error? | Bob | 01/02/2006 T 12:30:00 |
| WORKINPROGRESS | It is displaying an error unable to POP mail from server. | Smith | 01/02/2006 T 12:45:00 |
| WORKINPROGRESS | What is the version of Mail? | Bob | 01/02/2006 T 12:58:00 |
| WORKINPROGRESS | Mail 2000 | Smith | 01/02/2006 T 13:08:00 |

Issue: 124
Priority: P2

Title: Account Locked
Date Created: 01/02/2006T11:16:00

| Status | Description | Note By | TimeStamp | Hrs/ Events | Std Hrs./ Events | Deviation (Hrs) | Updated (Hrs:) |
|---|---|---|---|---|---|---|---|
| CREATED | Account is locked. | Brad | 01/02/2006 T 11:16:00 | 0.0 | 0.0 | 0.0 | 0.0 |
| ASSIGNED | Account is unlocked and reset. | | 01/02/2006 T 12:01:00 | 0.75 | 0.5 | -0.25 | 0.75 |
| WORKINPROGRESS | Account is unlocked. I am able... | Joe | 01/02/2006 T 12:12:00 | 0.18 | 0.5 | 0.32 | 0.18 |
| CLOSED | | Brad | 01/02/2006 T 12:33:00 | 0.35 | 5.0 | 4.65 | 0.35 |
| | | | | 1.27 | 6.0 | 4.73 | |

User Input
Original value computed by BPO

Issue: 125

Title: Unable to access Internet

| Issue | Priority | Date Created | Total Time Taken (Hrs.) | Original Time (Hrs.) | Total Deviation (Hrs.) |
|---|---|---|---|---|---|
| 123 | P1 | 01/02/2006 T 11:00:00 | 2.45 | 3.0 | 0.54 |
| 124 | P2 | 01/02/2006 T 11:16:00 | 1.27 | 6.0 | 4.73 |
| 125 | P2 | 01/02/2006 T 11:36:00 | 2.63 | 6.0 | 3.37 |
| 126 | P3 | 01/02/2006 T 12:59:00 | 75.14 | 6.0 | -69.14 |
| 127 | P3 | 01/02/2006 T 14:34:00 | 212.22 | 6.0 | -206.22 |

Fig. 7

BSO Business Optimization Engine

[Extract] [Analyze] [Export BPML]  Status [Optimizing done]  [Clear]

Issue: 123 , Title: Mail not working
Priority: P1 , Date Created: 01/02/2006T11:00:00

| Status | Description | Note By | TimeStamp |
|---|---|---|---|
| CREATED | Mail not working | Smith | 01/02/2006 T 11:00:00 |
| ASSIGNED | Mail not working | Bob | 01/02/2006 T 12:00:00 |
| WORKINPROGRESS | Please detail about it. Are you getting any specific error? | Bob | 01/02/2006 T 12:30:00 |
| WORKINPROGRESS | It is displaying an error unable to POP mail from server. | Smith | 01/02/2006 T 12:45:00 |
| WORKINPROGRESS | What is the version of Mail? | Bob | 01/02/2006 T 12:58:00 |
| WORKINPROGRESS | Mail 2000 | Smith | 01/02/2006 T 13:08:00 |

Issue: 124
Priority: P2                                    Title: Account Locked
                                                     Date Created: 01/02/2006T11:16:00

| Status | Description | Note By | TimeStamp | Hrs/Events | Std Hrs./Events | Deviation (Hrs) | Updated (Hrs:) |
|---|---|---|---|---|---|---|---|
| CREATED | Account is locked. | Brad | 01/02/2006 T 11:16:00 | 0.0 | 0.0 | 0.0 | 0.0 |
| ASSIGNED | Account is unlocked and reset. | Brad | 01/02/2006 T 12:01:00 | 0.75 | 0.5 | -0.25 | 0.25 |
| WORKINPROGRESS | Account is unlocked. I am able... | Joe | 01/02/2006 T 12:12:00 | 0.18 | 0.5 | 0.32 | 0.18 |
| CLOSED |  | Brad | 01/02/2006 T 12:33:00 | 0.35 | 5.0 | 4.65 | 0.35 |
|  |  |  |  | 1.27 | 6.0 | 4.73 |  |

← New User Input

← New process behavior automatically computed by BPO

Issue: 125                                      Title: Unable to access Internet

| Issue | Priority | Date Created | Total Time Taken (Hrs.) | Original Time (Hrs.) | Total Deviation (Hrs.) |
|---|---|---|---|---|---|
| 123 | P1 | 01/02/2006 T 11:00:00 | 2.45 | 3.0 | 0.54 |
| 124 | P2 | 01/02/2006 T 11:16:00 | 0.78 | 6.0 | 5.22 |
| 125 | P2 | 01/02/2006 T 11:36:00 | 2.63 | 6.0 | 3.37 |
| 126 | P3 | 01/02/2006 T 12:59:00 | 75.14 | 6.0 | -69.14 |
| 127 | P3 | 01/02/2006 T 14:34:00 | 212.22 | 6.0 | -206.22 |

BUSINESS OPTIMIZATION ENGINE THAT EXTRACTS PROCESS LIFE CYCLE INFORMATION IN REAL TIME BY INSERTING STUBS INTO BUSINESS APPLICATIONS

CROSS-REFERENCE TO RELATED APPLICATIONS

This application is related to the following commonly-owned, co-pending United States patent Applications filed on even date herewith, the entire contents and disclosure of each of which is expressly incorporated by reference herein as if fully set forth herein. U.S. patent application Ser. No. 12/023,741 (21561), for "BUSINESS PROCESS EXTRACTOR"; U.S. patent application Ser. No. 12/023,676 (21562), for "BUSINESS PROCESS OPTIMIZER"; U.S. patent application Ser. No. 12/023,723 (21563), for "BUSINESS PROCESS ANALYZER".

FIELD OF THE INVENTION

The present invention relates generally to process optimization technology, and more specifically to a system and method for optimizing enterprise applications driven by business processes.

BACKGROUND OF THE INVENTION

In today's world, continuous optimization of operational methods and procedures is a major focus of all major businesses. However, performing enterprise operations often requires implementing multiple, discrete computer applications. As a result, capturing and understanding operations or business processes that are part of an enterprise's business information technology (IT) solution is critical for any organization's optimization initiative. Among the many challenges faced when trying to understand operations are heterogeneous applications throughout the organization with no uniform way to capture and/or extract information from these applications, business processes that age before the advent of business process management (BPM) tools that are currently used for designing them, a gap between designed processes and executable process, and a need for human investigation to identify problems and suggest improvements for business processes.

U.S. Pat. Nos. 5,734,837 and 6,073,109 disclose a typical workflow engine, that is, a programming tool for workflow. A process can be created based on the workflow. However, neither analysis nor optimization of the process is performed.

U.S. Patent Application Publication No. 2005/0289138 discloses a near real-time system and method that analyzes large amounts of data. While the system uses XML format, it analyzes only data, not processes, and merely reports results. No optimization is performed. Similarly, U.S. Patent Application Publication No. 2005/0154700 discloses an extraction, analysis and processing system for specialized data from service industries. This approach is somewhat like typical data mining systems but focuses on a specific type of data, that of services industries.

U.S. Patent Application Publication No. 2004/0187140 discloses an application framework that may contain business processes. However, no analysis or optimization of the processes is performed.

Among the problems of the aforementioned systems are the lack of a standard way to capture and/or extract information from heterogeneous business applications, and the lack of automated means to identify and interpret business process problems, and to suggest improvements to maximize process results.

BRIEF SUMMARY OF THE INVENTION

The present invention advantageously provides a system and method for optimizing enterprise applications driven by business processes. The system includes a data repository, an extractor to perform real time extraction of process life cycle information from business solutions integrating heterogeneous independent business applications, the extractor storing the extracted information in the data repository, an analyzer to identify usage patterns in the extracted information, and an optimizer to optimize the extracted information and to create exportable output usable by external tools. The analyzer can employ user-defined algorithms and/or rules to identify the usage patterns. The optimizer can use process simulation mechanisms, what-if analysis, data stored in the data repository, data stored in a rule repository, and user input data, in any combination, to optimize the extracted information.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 is a screen display of an exemplary embodiment; and

FIG. 7 is another screen display of an exemplary embodiment.

DETAILED DESCRIPTION OF THE INVENTION

An inventive solution is presented to the need for a system and method to capture, evaluate, interpret, and optimize business processes that are part of business IT solutions. The disclosed business optimization engine (BOE) solves this problem with a system and method that provides a framework for extracting, analyzing, and optimizing business processes that bind heterogeneous enterprise applications together to deliver business functionality.

BOE provides a framework for operational business intelligence applications that would enable business analysts to understand how current business processes, as implemented in heterogeneous applications, actually perform their tasks, by clearly showing each step or task as well as the interaction among tasks in detail. BOE goes beyond a workflow examination to explore process flows. With its thorough extraction and analysis method, BOE generates a complete and accurate extracted business process from which an improved process can be designed. BOE enables users to discover problems with the current business processes, such as weak spots, bottlenecks, manual steps, and redundancies. Further, BOE offers recommendations for solving these problems by using predefined knowledge and reference models modeling end-to-end business or life cycle processes, as well as individual rules describing various steps of a business process. In addition to providing problem solving recommendations, the knowledge and reference models create a baseline for fixture analysis using adaptive learning techniques.

BOE does not require that a specific BPM tool be used in any of the applications. Instead, BOE can monitor messages generated by a variety of applications or middleware, so that integration among multiple applications can be achieved. Each component of BOE can function as a well defined set of web services to achieve seamless integration.

Figure 1:
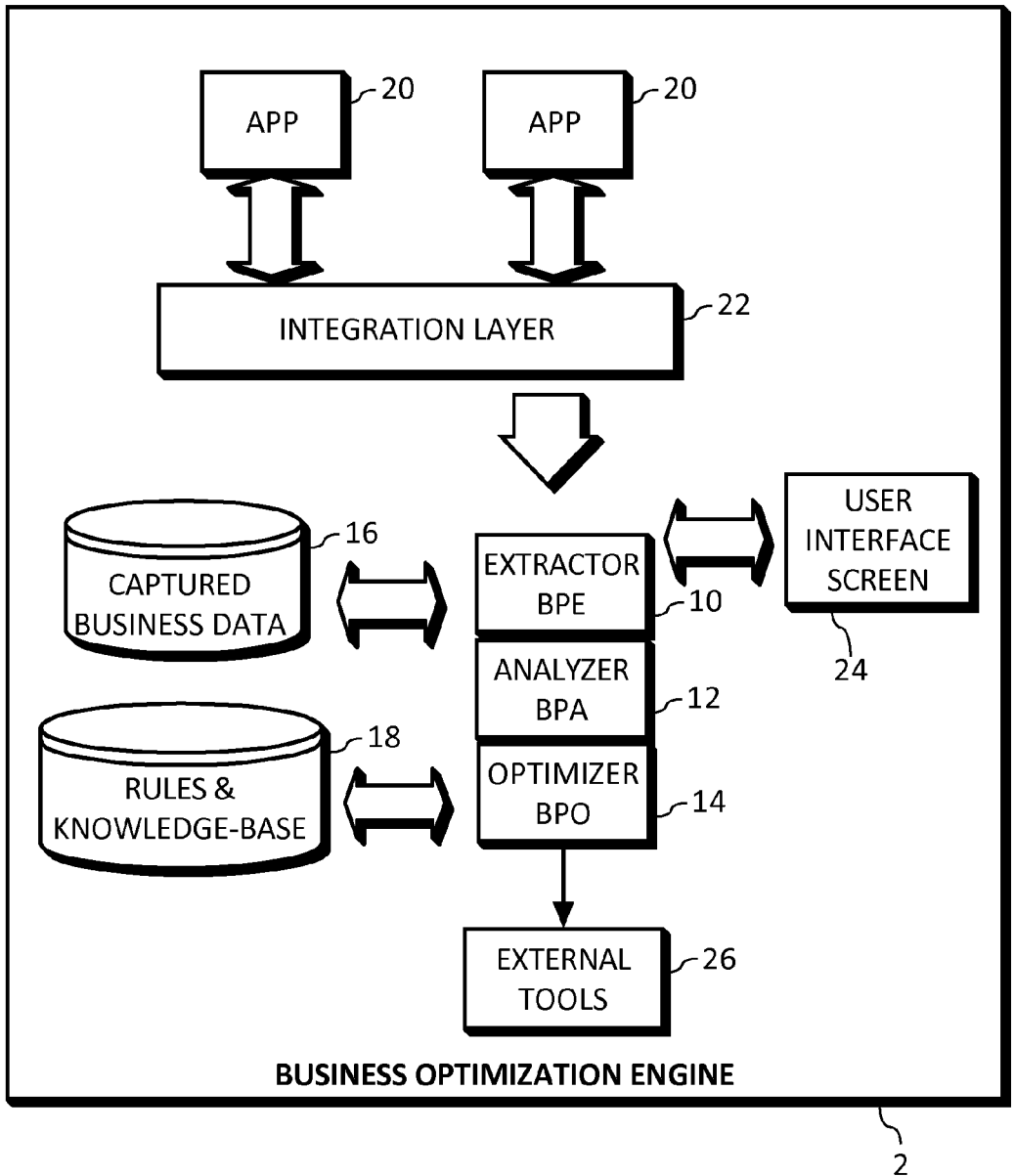
FIG. 1 is a schematic of business optimization engine architecture.

FIG. 1 is a schematic of BOE architecture 2. BOE 2 consists of three components: a business process extractor (BPE) 10, a business process analyzer (BPA) 12, and a business process optimizer (BPO) 14. Each component is described in more detail below. BOE 2 integrates with general BPM-based applications 20. An integration layer 22 provides the interface between middleware and/or the applications 20 and BPE 10. BOE 2 includes a user interface screen 24 described in more detail below. BOE 2 generates and manipulates process data, that is, business data and/or process cycles 16, and creates a rules and knowledge base 18. Reports (not shown) can be produced and output, and information can be exported to external tools 26. Agents can be used within BOE's application framework. In one embodiment, BOE 2 resides on top of CMLINK software.

Figure 2:
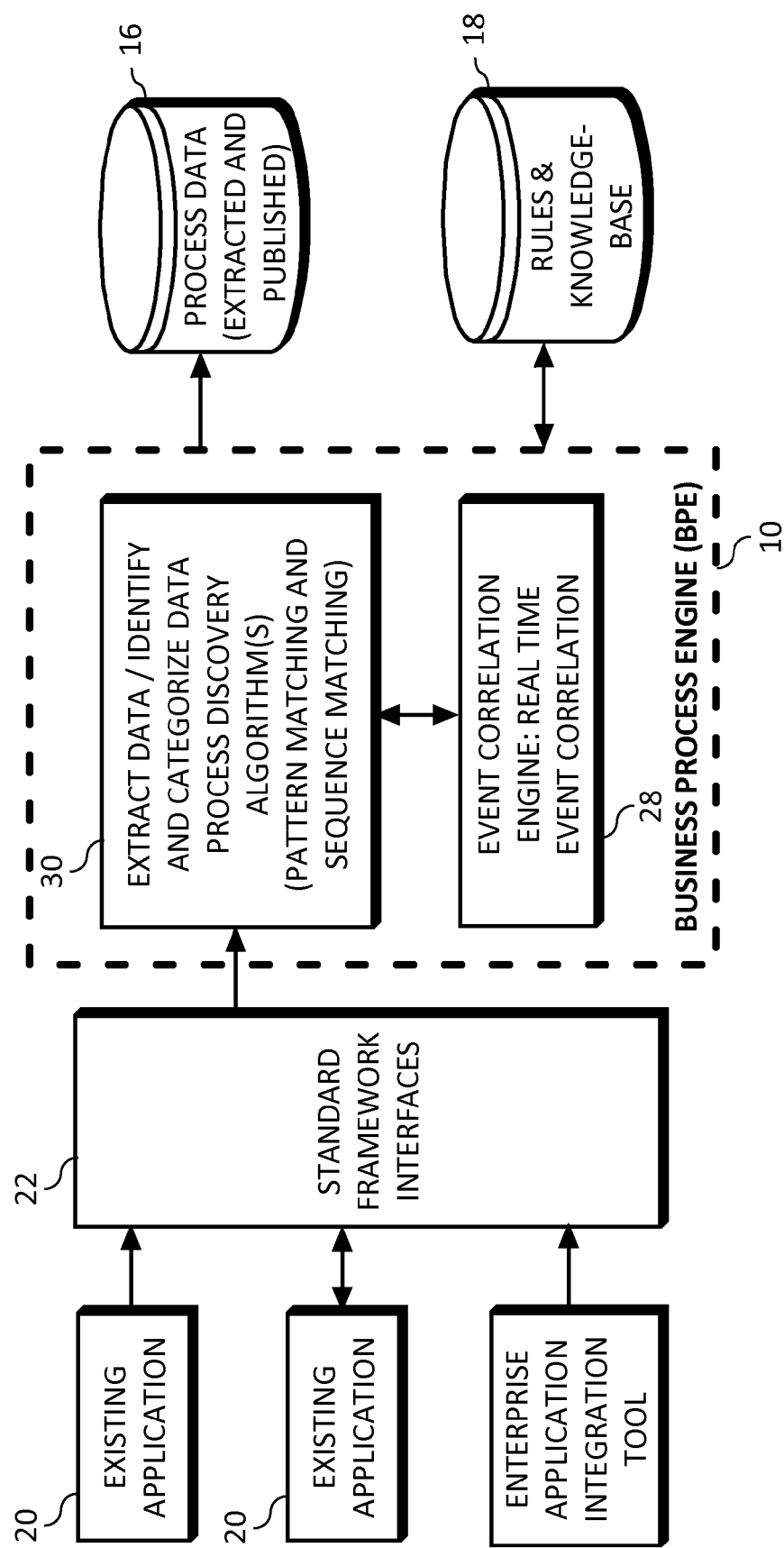
FIG. 2 is a schematic of the extraction component of the exemplary architecture.

FIG. 2 illustrates the components of BPE 10. DPE 10 extracts complete, i.e. end-to-end, process life cycle information from business solutions implemented by integrating heterogeneous independent BPM-based applications 20. Integration layer 22 includes standard framework interfaces, as well as other interface processes known in the art, and can be used to interface between the applications 20 and BPE 10. Real time processes are extracted from these applications 20, enabling creation of an exact "picture", that is a description of the steps, inputs, etc., of each existing process. This picture can illustrate, among other things, gaps within the process.

BPE 10 supports multiple ways of extracting process information. Three such techniques follow, but other extracting methods can be used. One approach employs a plug-in, such as ECM Integration Bridge, which can interpret messages exchanged via an integrated platform. A second technique uses a message "publish and subscribe" mechanisms in which BPE 10 subscribes for specific messages published by the integrated business solution. A third method involves seamlessly inserting stubs into existing applications to expose relevant message data to achieve the extraction. BPE 10 can use these or other extraction techniques in any combination.

The extracted data is then correlated and stored as process data in a data repository 16. In one embodiment, the message content of the extracted data is inspected using data present in the rules and knowledge base 18 to identify and categorize the process context within the message. Identification and categorization can be performed by process discovery 30 using pattern matching and sequence matching in conjunction with the data in the rules and knowledge base 18.

Once the process context is identified, BPE 10 correlates the identified message with other related process messages to create a complete end-to-end life cycle. An event correlation engine 28 can perform real time event correlation.

After being correlated, the life cycle or process cycle is published to the data repository as process data 16 in an industry standard format such as business process modeling notation (BPMN) or business process execution language (BPEL). As a result, BPE 10 provides a clear picture of the real time process. Further, extracted life cycle data can be used to determine how many similar cycles are present in the data repository 16 to help identify patterns, and to process usage patterns. The stored process data 16 is further analyzed by the BPA 12 as described below.

Figure 3:
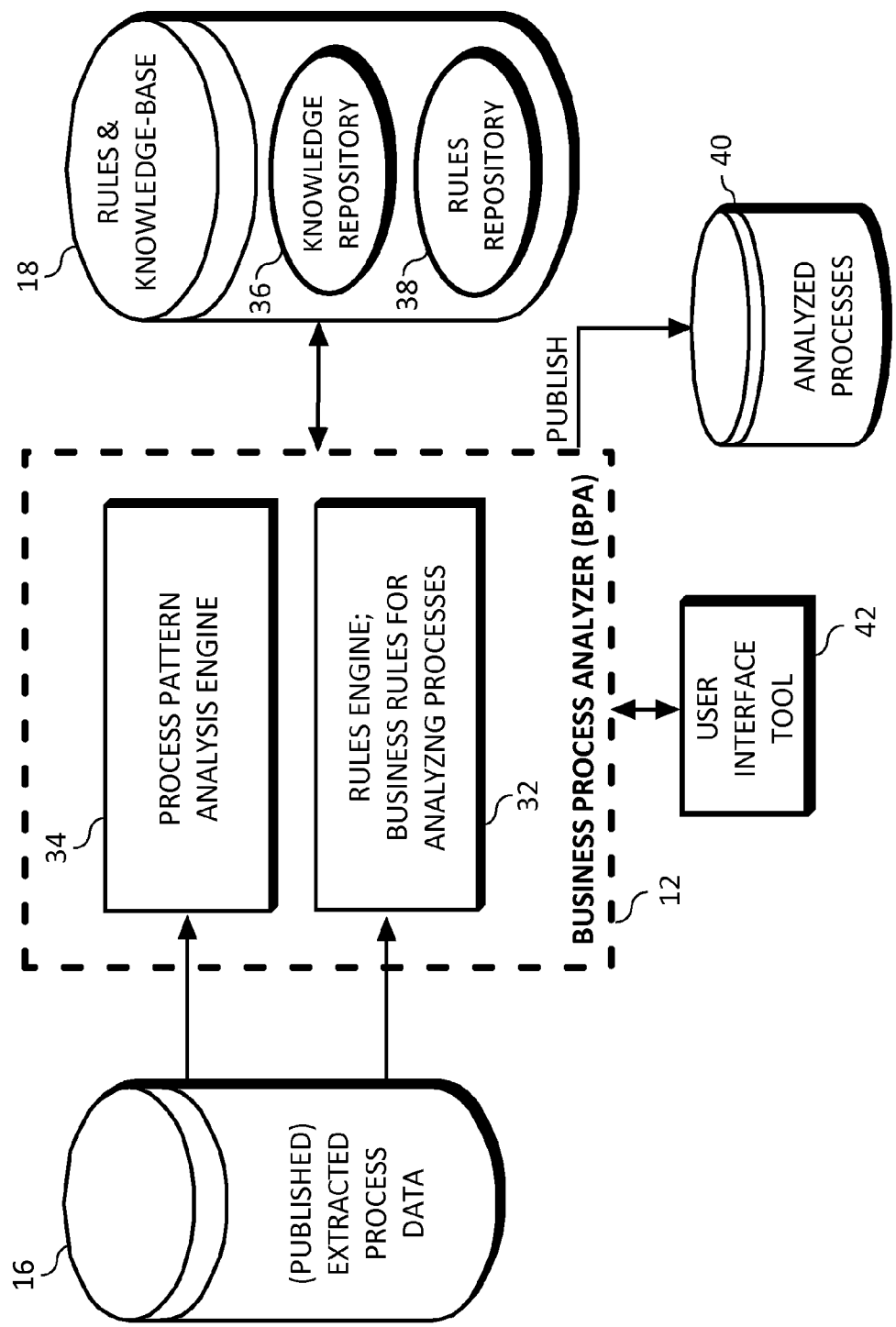
FIG. 3 is a schematic of the analytical component of the exemplary architecture.

FIG. 3 illustrates the components of the BPA 12 shown in FIG. 1. BPA 12 analyzes extracted process data 16 with a process pattern analysis engine 34. The analysis can be performed using reference models present in the knowledge repository 36 and/or rules from the rules repository 38 from rules and knowledge base 18, and identifies usage patterns in the extracted process data or cycles 16. In addition, this extracted process data 16 is correlated with data in the knowledge repository 36, which may include analyzed processes 40 previously output from BPA 12, as discussed below. The process data 16 can be used for identifying bottlenecks and fine-tuning a process. Also, information can be obtained from the analysis of the process data 16, such as a root cause for a process problem, for example, why the approval process takes so long. The process data 16 can also be used for adaptive learning, that is, adopting an efficient real time process as a standard reference model in the knowledge repository 36.

Analysis of the process data 16 by BPA 12 in relation to other extracted information from the knowledge/rules repositories 18 can provide insight into existing processes. BPA 12 can promote understanding of the interrelationships among business applications and processes, and can offer details regarding integration of different applications and process re-engineering including conversion of multiple parallel processes performed by different departments, to a single enterprise-level standard process.

A user interface tool 42 enables input and display of information and diagrams, such as extracted processes and/or steps of process data 16 being analyzed. BPA 12 can combine or compare the process data 16 with data from a knowledge repository 36, best practices, user input, and a rules repository 38 in a rules engine 32 to establish what process is where, what belongs, and how it relates. In accordance with one embodiment, BPA 12 can determine if a similar process has been encountered using data in the rules and knowledge base 18. Upon completion of the analysis, BPA 12 publishes analyzed processes 40. Further, based on the analysis, SPA 12 can recommend an integrated solution.

Figure 4:
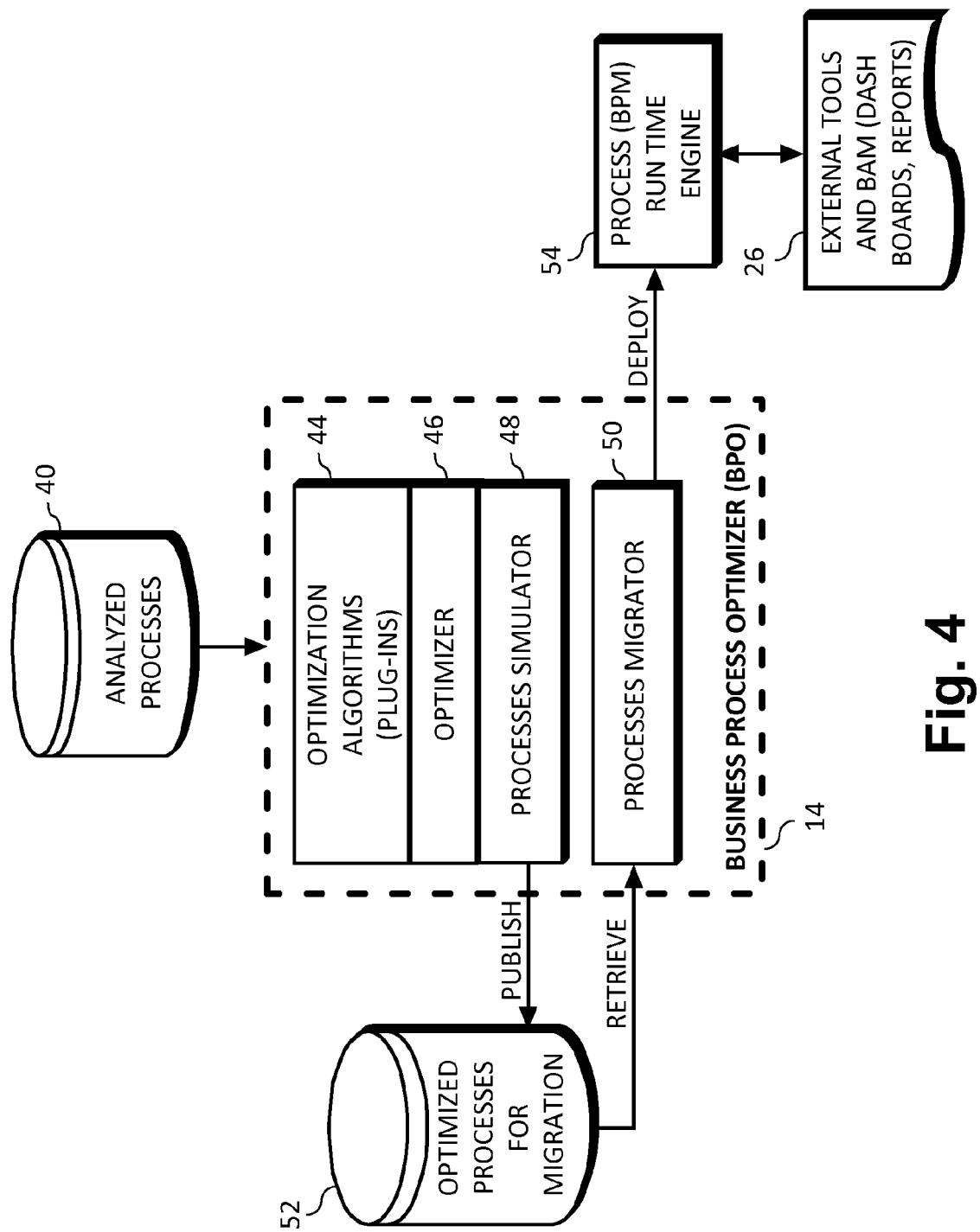
FIG. 4 is a schematic of the optimization component of the exemplary architecture.

FIG. 4 illustrates the components of the BPO 14. These components include process optimization algorithms 44, an optimizer 46, a process simulator 48, and a process migrator 50. Optimization algorithms 44 can include algorithms that perform "what if" analysis, heuristic methods of optimization, and other techniques. Multiple optimization techniques can be combined. The optimizer 46 suggests required modifications to the analyzed processes 40. The process simulator 48 simulates the processes 40 to determine how they perform. Optimized processes 52 are published for migration and can be input to the process migrator 50. The process migrator 50 outputs processes to a standard run time engine 54 and/or to external tools 26 such as business activity monitoring (BAM) tools for obtaining reports.

BPO 14 uses information stored in the knowledge/rules repositories 18 to optimize an analyzed process 40, creating an optimized process 52. In one embodiment, a business analyst can interact with the system to manually optimize an analyzed process 40.

Figure 5:
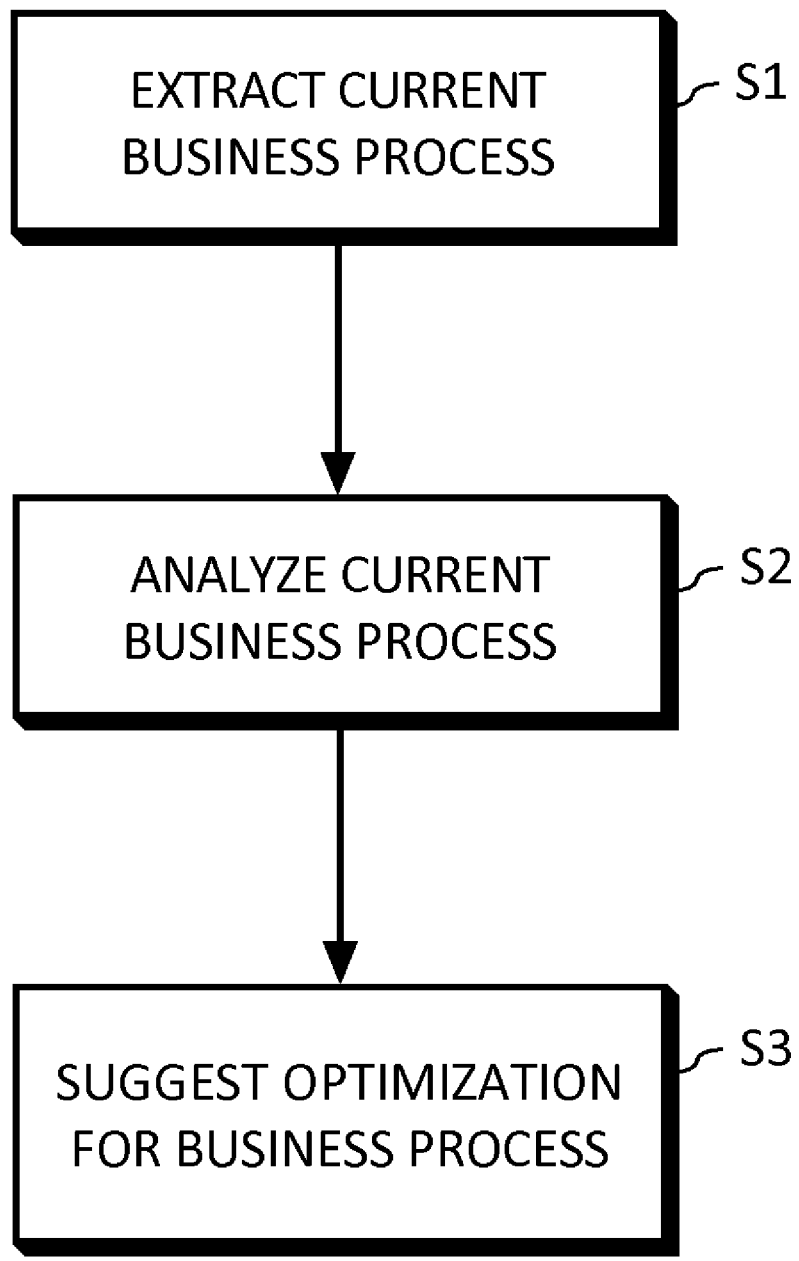
FIG. 5 is a flow diagram of business optimization engine.

FIG. 5 is a flow diagram for an exemplary embodiment of BOE 2 as illustrated in FIG. 1. In step S1, the BPE 10 extracts one or more current business processes 16 from BPM-based applications 20. These business processes 16 are stored as extracted process data 16, and individually analyzed by the BPA 12 in step S2. The analysis can include identifying usage patterns, comparing extracted processes 40 with pre-defined processes in the rules repository 38, and other techniques. Upon completion of the analysis, analyzed processes 40 are output. In step S3, based on the analysis, BPO 14 provides optimization suggestions for each individual process 40 analyzed in step S2. In one embodiment, current business processes can be monitored.

FIGS. 6 and 7 show a sample user interface screen 24 for one embodiment of BOE 2. The top portion of the screen displays a process flow for Issue 123 and the middle portion of the screen displays a process flow for Issue 124. This data has been extracted by BPE 10 and saved as extracted process data 16. As shown in FIGS. 6 and 7, each entry or activity in the process flow includes a status, a description, a "note by" employee, and a time stamp. These items are displayed on both the screen's top portion and the screen's middle portion. The screen's middle portion also includes analysis and displays the actual hours each event took (Hrs./Event), along with a standard number of hours per event (Std Hrs./Event) obtained, for example, from a rules repository 38. The deviation or difference between actual and standard is calculated and displayed (Deviation (Hrs.)) along with an updated column (Updated (Hrs.)) in which "what-if" analysis can be performed. The updated column is initially populated with the data from the actual hours/event column, as shown in FIG. 6. A user can perform "what-if" analysis by changing one or more entries in the updated column. FIG. 7 illustrates a "what-if" analysis, described in more detail below.

The screen's bottom portion, shown in FIGS. 6 and 7, illustrates optimized process outcome for multiple extracted process flows, including the Issue 123 displayed in the screen's top portion and the Issue 124 displayed in the screen's middle portion. Changes in the updated column in the middle portion are reflected in the corresponding row of the bottom portion. As shown in FIG. 7, the user changed the ASSIGNED row for Issue 124 in the screen's middle portion from 0.75 (Hrs.) to 0.25 (Hrs.). This resulted in the "total time taken" column in the top row of the screen's bottom portion, that is, the row for Issue 124, changing from 1.27 (Hrs.) to 0.78 (Hrs.), and the "total deviation" column changing from 4.73 (Hrs.) to 5.22 (Hrs.). The "total deviation" is computed by BPO 14 as the "total time taken" subtracted from the "original time", that is, the amount of time originally allocated for the task. The original time can be obtained, for example, from the rules repository 38 or knowledge repository 36.

BOE 2 seamlessly translates the identified process in the form of BPMN and/or BPEL. Translated business processes can be exported to external tools 26 like MS Visio®. This feature simplifies the making of process changes, by enabling the use of any tool that supports BPEL and BPMN standards to implement changes. Accordingly, BOE 2 not only helps in identifying bottlenecks in the existing solutions but also improves performance of the solutions to the optimum level.

While the present invention has been described in particular embodiments, it should be appreciated that the present invention should not be construed as limited by such embodiments, but rather construed according to the below claims.

What is claimed is:

1. A system for optimizing enterprise applications driven by business processes, said system comprising:
   a data repository;
   an extractor extracting in real time process life cycle information from business applications, said process life cycle information being stored in said data repository, the extractor using at least one of a plug-in, a message publish and subscribe mechanism, and a stub insertion mechanism, said plug-in extracting the life cycle information by interpreting messages exchanged via an integrated platform, said message publish and subscribe mechanism extracting the life cycle information by subscribing for specific messages, said stub insertion mechanism extracting the life cycle information by inserting stubs into existing applications to expose relevant message data;
   an analyzer identifying usage patterns in said process life cycle information using at least one of user-defined algorithms, rules and reference process models, said analyzer identifying the usage patterns using pattern recognition and sequence matching in conjunction with the at least one of user-defined algorithms, rules and reference process models; and
   an optimizer optimizing said process life cycle information based on said usage patterns, the optimizer using at least one of process simulation mechanism, what-if analysis, data stored in a knowledge repository, data stored in a rule repository, a heuristic method, and user input data, wherein said optimizer creates exportable output usable by external tools.

2. The system according to claim 1, wherein said data repository is a knowledge database.

3. A method for optimizing enterprise applications driven by business processes, comprising:
   extracting in real time process life cycle information from business applications, said extracting performed using at least one of a plug-in, a message publish and subscribe mechanism, and a stub insertion mechanism, said plug-in extracting the life cycle information by interpreting messages exchanged via an integrated platform, said message publish and subscribe mechanism extracting the life cycle information by subscribing for specific messages, said stub insertion mechanism extracting the life cycle information by inserting stubs into existing applications to expose relevant message data;
   identifying usage patterns in said process life cycle information using at least one of user-defined algorithms, rules and reference process models, said identifying the usage patterns performed using pattern recognition and sequence matching in conjunction with the at least one of user-defined algorithms, rules and reference process models; and
   optimizing said process life cycle information based on said usage patterns and creating exportable output based on said process life cycle information, said optimizing performed using at least one of process simulation mechanism, what-if analysis, data stored in a knowledge repository, data stored in a rule repository, a heuristic method, and user input data, said output comprising processes displayed on a user interface screen and being usable by external tools.

4. The method according to claim 3, wherein said process life cycle information is stored in a data repository.

5. A computer readable storage device having computer readable program for operating on a computer for optimizing enterprise applications driven by business processes, said program comprising instructions that cause the computer to perform the steps of:
   extracting in real time process life cycle information from business applications, said extracting performed using at least one of a plug-in, a message publish and subscribe mechanism, and a stub insertion mechanism, said plug-in extracting the life cycle information by interpreting messages exchanged via an integrated platform, said message publish and subscribe mechanism extracting the life cycle information by subscribing for specific messages, said stub insertion mechanism extracting the life cycle information by inserting stubs into existing applications to expose relevant message data;

identifying usage patterns in said process life cycle information using at least one of user-defined algorithms, rules and reference process models, said identifying the usage patterns performed using pattern recognition and sequence matching in conjunction with the at least one of user-defined algorithms, rules and reference process models; and optimizing said process life cycle information based on said usage patterns and creating exportable output based on said process life cycle information, said output usable by external tools, said optimizing performed using at least one of process simulation mechanism, what-if analysis, data stored in a knowledge repository, data stored in a rule repository, a heuristic method, and user input data.

6. The computer readable program code according to claim 5, wherein said process life cycle information is stored in a data repository.

* * * * *